July 11, 1950  E. H. MUELLER  2,514,552
FLASH TUBE STRUCTURE FOR GASEOUS PILOT BURNERS
Filed Oct. 4, 1945

INVENTOR
Ervin H. Mueller

BY
Barnes Kisselle Laughlin & Raisch
ATTORNEYS

Patented July 11, 1950

2,514,552

UNITED STATES PATENT OFFICE 2,514,552

FLASH TUBE STRUCTURE FOR GASEOUS PILOT BURNERS

Ervin H. Mueller, Grosse Pointe, Mich.

Application October 4, 1945, Serial No. 620,307

7 Claims. (Cl. 158—115)

This invention relates to lighters for gas burners and has to do particularly with a lighter structure of the type for association with a plurality of burners.

In gas ranges there are usually a plurality of burners arranged in a more or less symmetrical group and for lighting these burners, when gas is supplied thereto, a pilot flame has heretofore been disposed centrally of the group of burners. One type of lighter is the so-called flash tube lighter wherein there is a tube extending substantially from the pilot flame to each burner and arranged so that when gas is supplied to a burner some of the gas flows through the tube, is ignited by the pilot flame and the resultant flash-back or explosion ignites the gas issuing from the burner.

The present invention is directed to lighters of the above mentioned type and is concerned particularly with the construction adjacent the pilot flame for supporting the ends of the tubes adjacent the pilot flame.

One of the objects of this invention is to provide an improved construction wherein the tube support is in the form of a ring member and the tubes are detachably mounted or threaded upon the supporting member. This permits of shipping the central supporting structure and the tubes separately so that they can be placed in convenient compact packages. The tubes, however, can be quickly and easily mounted upon the ring member and can be removed therefrom by any person of the household after the range is in use for such purposes, such as repair, or to provide access to other parts or for cleaning.

Constructions for carrying out the invention are shown in the accompanying drawing wherein.

The range structure selected to demonstrate the environment is generally illustrated as having a frame or supporting structure 1 with four gas burners 2, each controlled by its corresponding valve 3, it being understood that the valves are operable to open and close the connection between the burners and a supply of gas furnished through the pipe or manifold 4.

Figure 1:
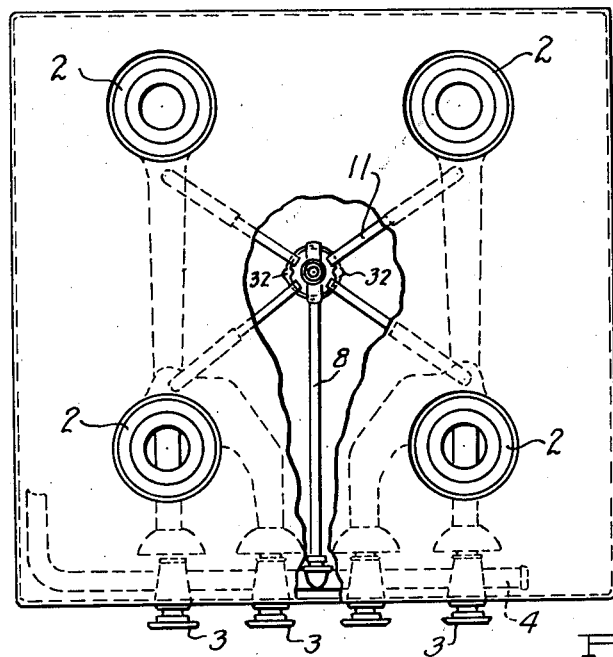
Fig. 1 is a plan view illustrating a rather conventional arrangement of burners in a range with a lighter construction associated therewith.

There is a gas supply tube 8 which extends from the supply pipe 4 to a relatively central location where its inner end may be turned upwardly to provide a burner as illustrated at 9 for furnishing gas to a pilot flame 10 which burns substantially constantly. Extending from points in proximity to the pilot flame are flash tubes, each generally indicated at 11. The outer ends of the flash tubes, as shown in Fig. 1, lie in proximity to the respective burners, while the inner ends are supported adjacent the pilot flame.

Figure 2:
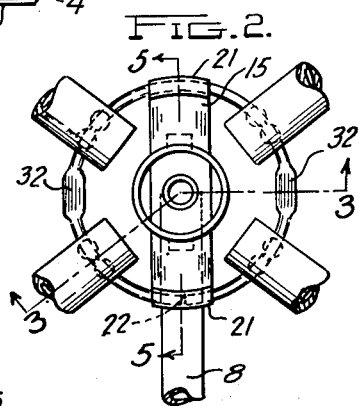
Fig. 2 is an enlarged plan view of the structure at the pilot flame showing the tubes mounted upon their support.
Figure 3:
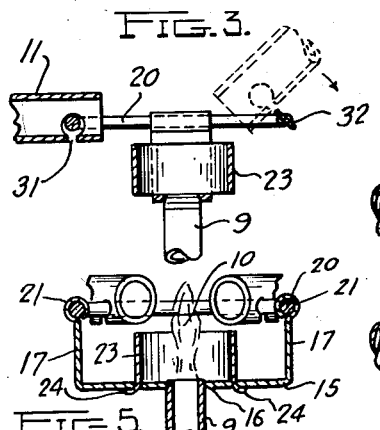
Fig. 3 is a cross sectional view taken substantially on line 3—3 of Fig. 2 illustrating the structure and illustrating how the tubes are assembled.
Figures 5, 6:
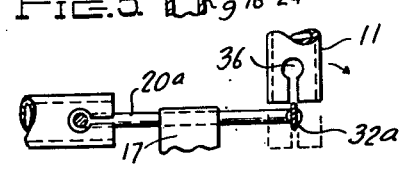
Fig. 5 is a cross sectional view taken substantially on line 5—5 of Fig. 2 showing further structural features.
Fig. 6 is a view of a flash tube of a modified form.

The form of support, which in some cases is termed a housing, as shown in Figs. 2, 3 and 5, resides in a suitable bracket 15 having a cross part mounted in its central portion on the end of the tube 9 as shown at 16. Extending upwardly from the ends of the cross part are portions 17. The direct supporting member is in the form of a wire or length of material, preferably round in cross section, fashioned into the shape of a ring as illustrated at 20 and suitably supported by the upstanding portions 17. This may be accomplished by fashioning the metal around the ring as shown at 21. The ends of the length of wire providing the ring may and preferably are disposed within one of the fashioned loops 21 as illustrated at 22. The central construction may also incorporate a guard or shield for the pilot flame which has a suitable wall 23 surrounding the pilot flame to protect it from drafts and explosion forces. This guard may be of tubular shape and fastened to the part 15 of the bracket by means of lugs 24.

Figure 4:
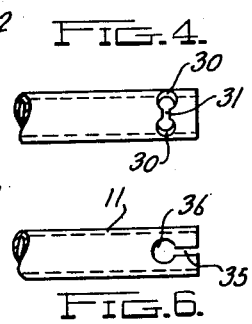
Fig. 4 is a detailed view illustrating the tube structure.

One construction for the inner end of each flash tube is as illustrated in Figs. 3 and 4 wherein it will be observed that the tube is provided with a specially shaped aperture. This aperture is similar to the shape of a figure 8 having enlarged end portions 30 and a restricted intermediate portion 31. The lengthwise dimension of the aperture runs circumferentially of the tube and the enlarged portions may be in a position as substantially illustrated in Fig. 3 at the sides of the tube considering that the restricted portion 31 is lowermost. Now, in order to assemble such a tube structure to the supporting member 20 the member 20 is provided with one or more flattened portions 32. In placing the tube upon the ring the flattened portion is passed through the restricted part 31 of the aperture and then the tube is shifted circumferentially so that the rounded part of the ring 20 slides into the enlarged end portions 30 of the notch. This is demonstrated in Figs. 3 and 5. The flattened portions may be and preferably are so located that when the flash tubes are in a normal position extending to the burners that the enlarged portions of the apertures in the tubes fit over the rounded portion of the supporting ring; in other words, the tubes are displaced from the flattened portions. The flattened portions 32 may be disposed so that the portion or section is angular relative to a horizontal plane and, as shown in Fig. 3, the flattened section is disposed at about a 45° angle. In this case the tube is positioned at about the same angle as illustrated by the dotted lines of Fig. 3 and then passed over the support. After the tube has been passed over the support with the narrow portion moving through the restricted part 31 of the slot the tube may be shifted circumferentially and it may be swung to its normal position which may be substantially horizontal. The enlarged portions 30 encircle the wire to such an extent that the tube may not be removed therefrom. Indeed, with the flat portions 32 disposed as shown, a tube may be shifted circumferentially past a flat portion and is not removable even by upward forces so long as the tube is in a horizontal position or near such position. This is because of the angular disposition of the flat portion. Of course, it is within the invention to select the desired angle of the flat portion and it may be positioned so that the flat portion is horizontal or vertical.

Figures 7, 8, 9:
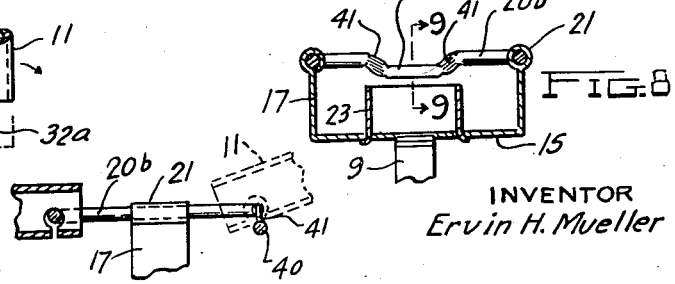
Fig. 7 is a view similar to Fig. 3 showing a modified form of support adapted for use in conjunction with the tube shown in Fig. 6.
Fig. 8 is a sectional view similar to Fig. 5 showing a further modified form.
Fig. 9 is a sectional view taken substantially on line 9—9 of Fig. 8.

A modified form of tube is shown in Fig. 6, the tube carrying the same general reference character 11, but the end of the tube is provided with a notch structure comprising lengthwise extending narrow or restricted portions 35 leading from the end of the tube to enlarged portions 36, it being understood that there is such a notch structure on diametrically opposite sides of the tube. With this form of tube the flat portion 32a of the supporting ring 20a is advantageously and preferably disposed in a vertical position as shown in Fig. 7. Thus, to attach a tube it is disposed in a vertical position as illustrated and the slot structure 35 is passed over the flattened portion 32a whereupon the tube may be shifted circumferentially to bring the rounded section of the supporting wire into the enlarged portions 36. When this form of tube is disposed in a horizontal position as shown in Fig. 7 it cannot be removed from the wire by radial forces which tend to shift the tube inwardly or outwardly.

A further form of construction is shown in Figs. 8 and 9 wherein the bracket and related parts are the same as those previously described and shown in Figs. 2, 3 and 4. In this form the wire 20b is formed with depressed portions 40. One side, or preferably both sides of the depressed portion, as shown at 41, are flattened and a tube constructed as shown in Fig. 4 may be used. In assembling the tube it is disposed in the depression and then the tube is shifted laterally. The restricted portion 31 passes over the flattened portion 41 so that the portions defining the restricted part of the notch engage under the enlarged or rounded section of the wire as illustrated in Fig. 9.

Where the ring member is mounted as shown in Figs. 1 and 2 by means of a bracket which engages the ring the tubes may not be slidable across the bracket portions 21. Therefore, in order to mount tubes on both exposed sides of the ring member, each side will have to be flattened. The dimensions of the parts may be such that the aperture of the tube, as shown in Fig. 4, may move over a bracket portion 21 by reason of the fact that the restricted portion 31 will pass over the bracket portion 17 and by reason also of the fact that the enlarged portions 30 will pass over the portions 21 of the bracket. In such a construction or with a similar arrangement, the ring may be provided with only a single flattened portion so that all the tubes may be mounted by the use of a single flattened portion. In this connection, the tube structure shown in Fig. 6 may also be arranged to slide past a bracket portion if the tube be turned to a vertical position as illustrated in Fig. 7. Due to the detachability of the tubes the central supporting structure and the tubes may be shipped by a manufacturer in a disassembled relationship. Therefore, the tubes can be compactly packaged for shipment purposes. The assembly can easily be made by the range manufacturer or other assembly operator. Moreover, after the device is in use a member of the household can easily detach one or more tubes and replace them should it be necessary or desirable to do so in order to clean the range structure or to repair or replace parts or to make some other location more accessible for any reason.

I claim:

1. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the tube adjacent the pilot burner substantially in the form of a closed ring of wire, means for supporting the ring at locations spaced circumferentially of the ring, each flash tube having a notch formation therein with a relatively enlarged portion for receiving the supporting ring and a relatively restricted portion leading to the relative enlarged portion, the cross dimensions of the supporting ring being greater than the cross dimension of the restricted portion of the notch and a flattened portion in the supporting ring, the flash tubes being adapted to be mounted on the supporting ring by the passage of the restricted portion of the notch formation over the flattened portion of the ring and by circumferential movement of the flash tubes to position the enlarged portion of the notch formation over the ring.

2. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the tube adjacent the pilot burner substantially in the form of a closed ring of wire, means for supporting the ring at locations spaced circumferentially of the ring, each flash tube having a notch formation therein with a relatively enlarged portion for receiving the supporting ring and a relatively restricted portion leading to the relative enlarged portion, the cross dimensions of the supporting ring being greater than the cross dimension of the restricted portion of the notch and a flattened portion in the supporting ring, the flash tubes being adapted to be mounted on the supporting ring by the passage of the restricted portion of the notch formation over the flattened portion of the ring and by circumferential movement of the flash tubes to position the enlarged portion of the notch formation over the ring, the flattened portion being disposed so that the flat sides thereof are disposed at an angle to the horizontal so that the flash tubes, when in a normal position approximating the horizontal, are held in mounted position against radial and vertical movement.

3. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the flash tubes adjacent the pilot burner substantially in the form of a closed ring of wire, means for supporting the ring at locations spaced circumferentially of the ring, each flash tube having a notch formation therein extending circumferentially with enlarged end portions and a restricted intermediate portion, the ring having a cross dimension greater than that of the restricted intermediate portion of the notch, and a flattened portion in the supporting ring adapted for the passage thereover of the restricted intermediate portion of the notch formation of a tube so that upon circumferential movement of a tube the enlarged portions of the notch formation engage over the supporting ring.

4. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the flash tubes adjacent the pilot burner substantially in the form of a closed ring of wire, means for supporting the ring at locations spaced circumferentially of the ring, each flash tube having a notch formation therein extending circumferentially with enlarged end portions and a restricted intermediate portion, the ring having a cross dimension greater than that of the restricted intermediate portion of the notch, and a flattened portion in the supporting ring adapted for the passage thereover of the restricted intermediate portion of the notch formation of a tube so that upon circumferential movement of a tube the enlarged portions of the notch formation engage over the supporting ring, the flattened portion being disposed so that its flat sides are at an angle to a vertical and horizontal thereby requiring an angular position of the tube when the restricted portion of the notch portion is passed thereover, whereby the flattened portion holds the tube in position against radial and vertical movement when the tube is in a normal position approximating the horizontal.

5. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the flash tubes adjacent the pilot burner substantially in the form of a closed ring, means for supporting the ring, each flash tube having a notch formation therein with relatively enlarged portions positioned approximately diametrically opposite each other and with relatively restricted portions with cross dimensions less than that of the ring leading from the end of the tube to the enlarged portions and a flattened portion in the supporting ring adapted for the passage of the restricted portions thereover so that upon circumferential shift of the flash tubes the enlarged portions of the notch formation engage the supporting ring.

6. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the flash tubes adjacent the pilot burner substantially in the form of a closed ring, means for supporting the ring, each flash tube having a notch formation therein with relatively enlarged portions positioned approximately diametrically opposite each other and with relatively restricted portions with cross dimensions less than that of the ring leading from the end of the tube to the enlarged portions, and a flattened portion in the supporting ring adapted for the passage of the restricted portions thereover so that upon circumferential shift of the flash tubes the enlarged portions of the notch formation engage the supporting ring, said flattened portion being disposed substantially vertically whereby to hold the flash tubes attached to the supporting ring against outward radial movement when the flash tubes are in a normal position approximating the horizontal.

7. In a lighter structure for a plurality of gas burners grouped around a pilot flame, gas supply means constituting a burner for a pilot flame, a plurality of flash tubes each extending from a location adjacent the pilot flame to a burner whereby some of the gas supplied to a burner flows through the respective flash tube to be ignited by the pilot flame so that the gas issuing from the burner is ignited by the resultant flash, supporting means for the ends of the flash tubes adjacent the pilot burner substantially in the form of a closed ring, means for supporting the ring, each flash tube having a notch formation therein with a relatively enlarged portion for receiving the ring and a relatively restricted portion with a cross dimension less than that of the ring leading to the enlarged portion, said ring having a depressed section with at least one side of the depressed section flattened so that its thickness will pass through the restricted portion of the notch formation, whereby a flash tube, when positioned in the depressed section, may be shifted laterally to thread the ring within the enlarged portions of the notch formation with the flattened portion passing through the restricted portion of the notch formation.

ERVIN H. MUELLER.

REFERENCES CITED

The following references are of record in the file of this patent:

UNITED STATES PATENTS

| Number | Name | Date |
| --- | --- | --- |
| Re. 21,496 | Stuckenholt et al. | June 25, 1940 |
| 770,595 | Lovette | Sept. 20, 1904 |
| 1,602,754 | Delbridge | Oct. 12, 1926 |
| 2,295,001 | Mueller | Sept. 8, 1942 |
| 2,295,002 | Mueller | Sept. 8, 1942 |